Feb. 9, 1932.   R. L. HIBBARD   1,844,577
CHUCK
Original Filed May 17, 1928   4 Sheets-Sheet 1

INVENTOR
Robert L. Hibbard
by
James E. Bradley

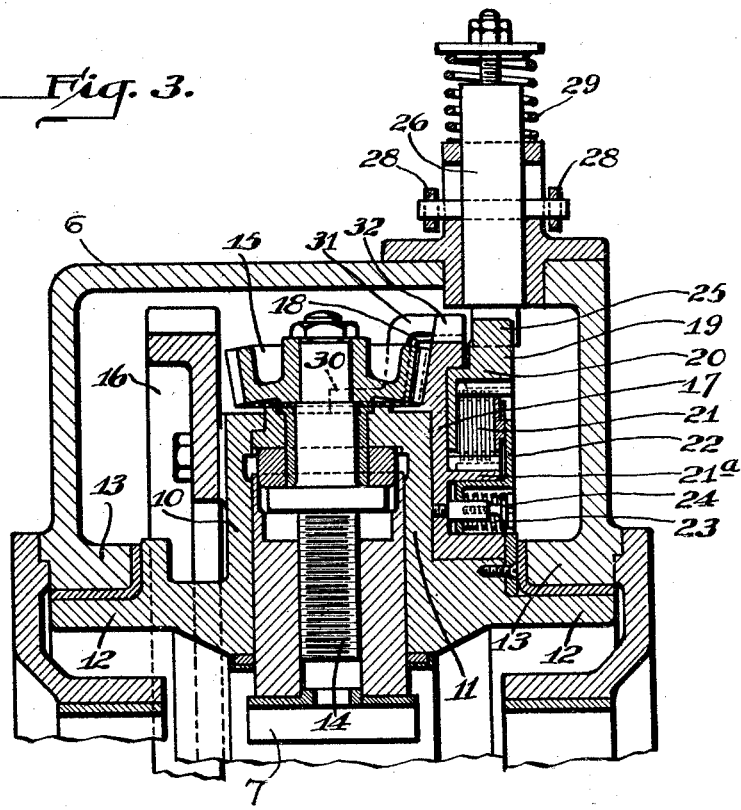
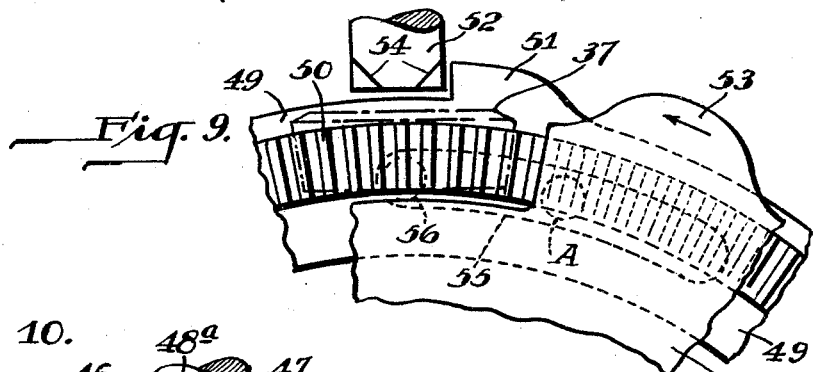
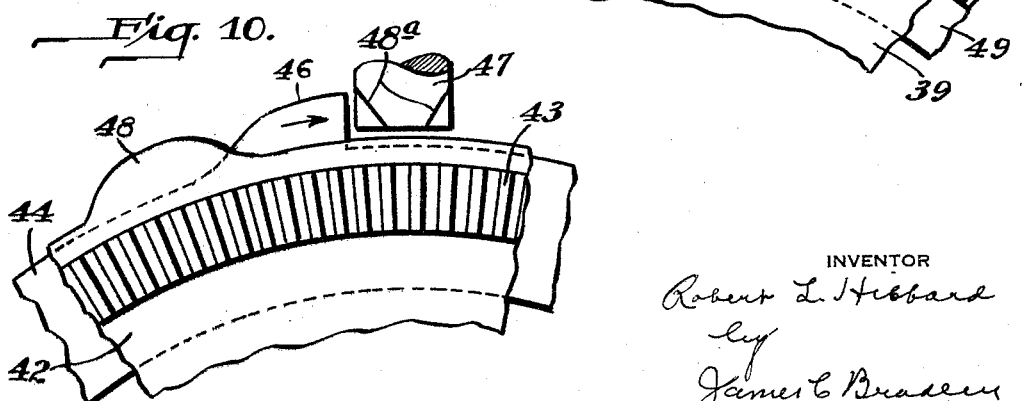

Feb. 9, 1932.   R. L. HIBBARD   1,844,577
CHUCK
Original Filed May 17, 1928   4 Sheets-Sheet 3

INVENTOR
R. L. Hibbard
by
H. Bradley
atty

Patented Feb. 9, 1932

1,844,577

UNITED STATES PATENT OFFICE

ROBERT L. HIBBARD, OF BELLEVUE, PENNSYLVANIA, ASSIGNOR OF ONE-HALF TO WILLIAM K. STAMETS, OF PITTSBURGH, PENNSYLVANIA

CHUCK

Original application filed May 17, 1928, Serial No. 278,560. Divided and this application filed December 6, 1930. Serial No. 500,533.

Figure 1:
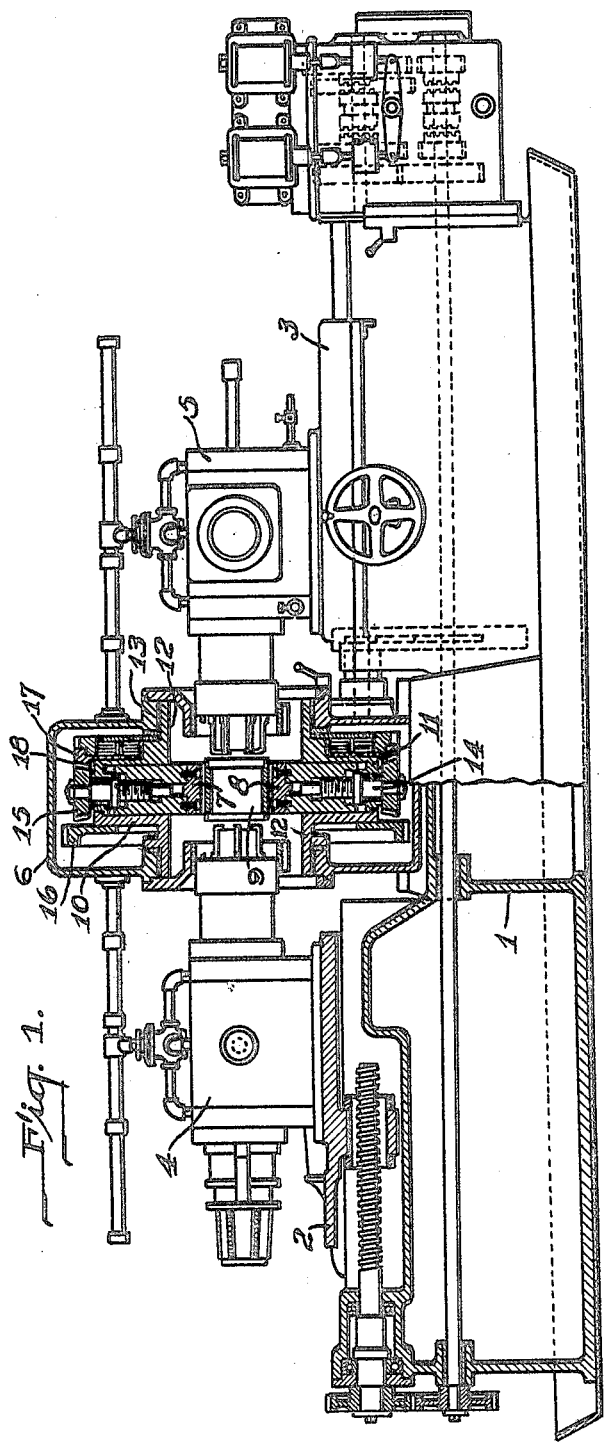
Figure 2:
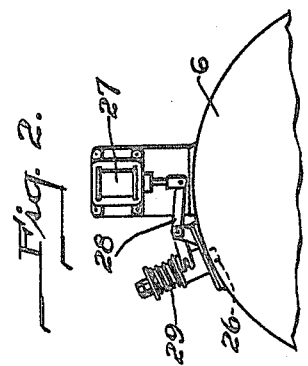
Figure 6:
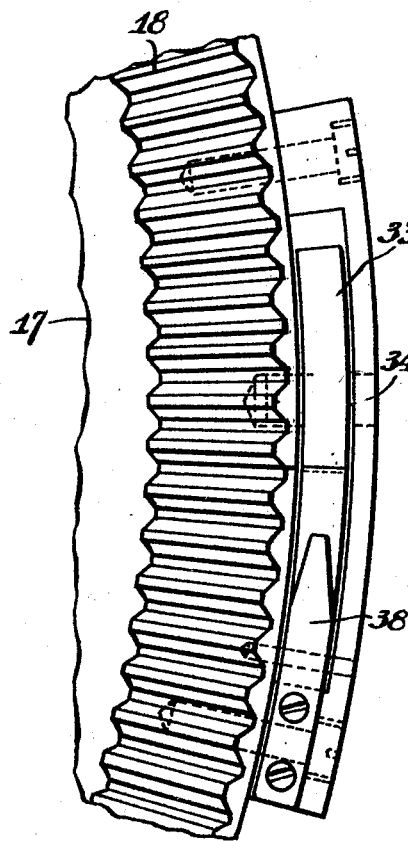
Figure 7:
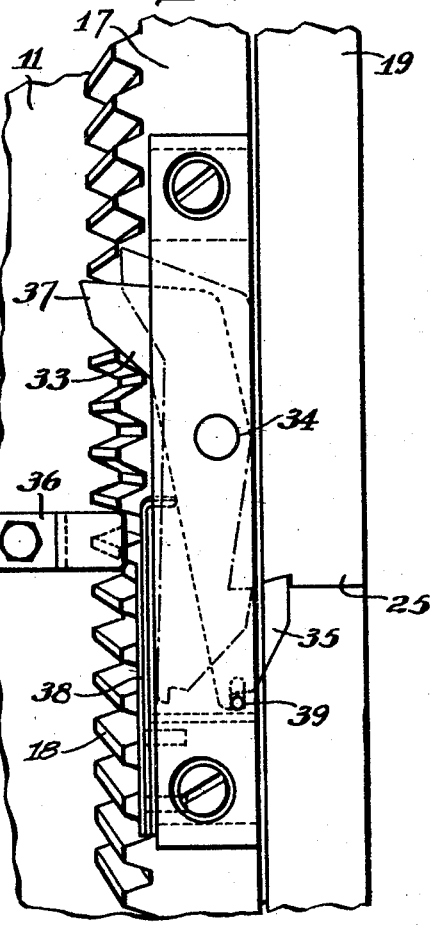
Figure 4:
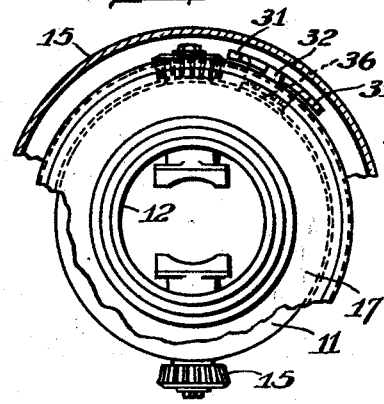
Figure 5:
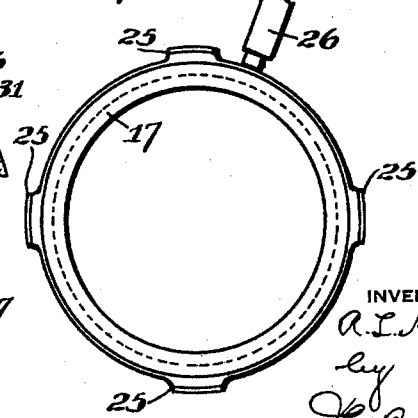
Figure 8:
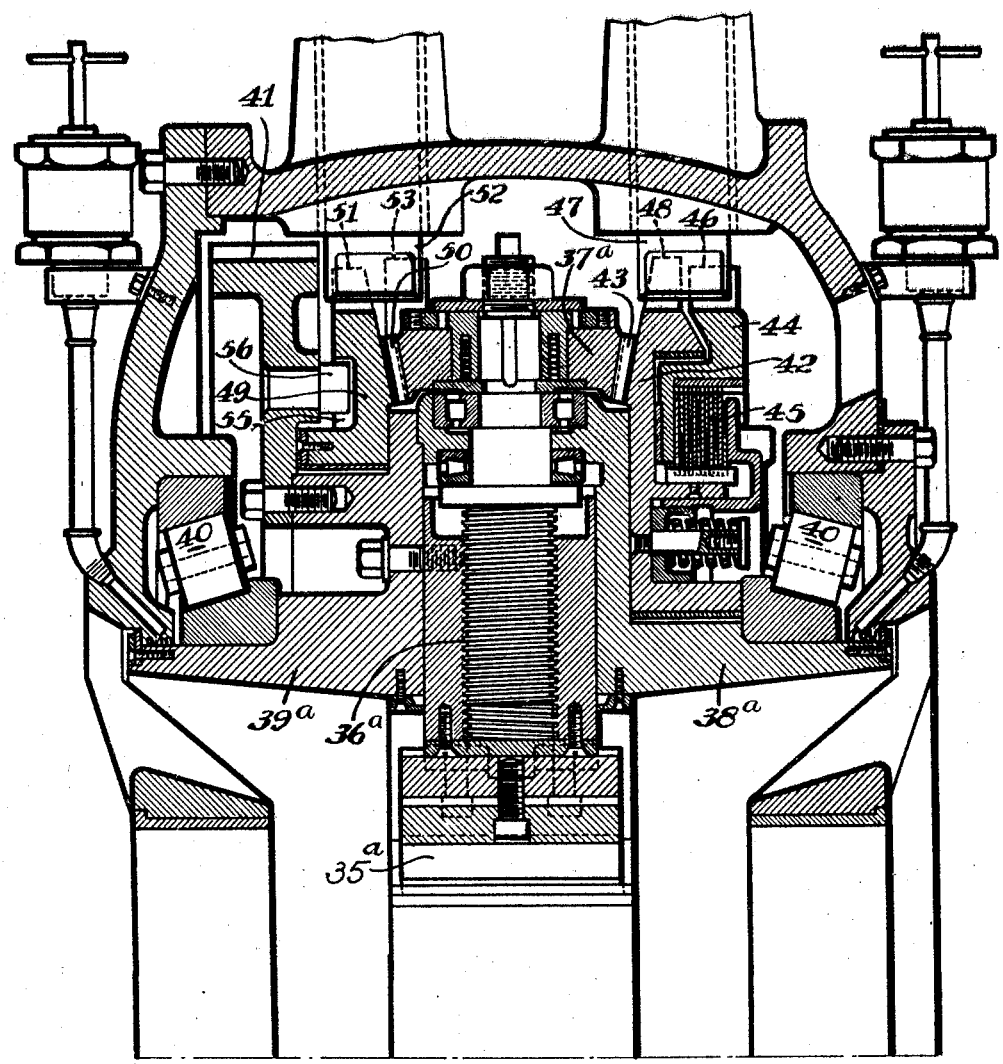

The invention relates to chucks for machine tools, such as the machine for making couplings shown in my application, Serial No. 278,560, filed May 17, 1928, now Patent Number 1,788,193 granted Jan. 6, 1931, of which the present application is a division. It has for its objects the provision of an improved chuck which may be employed to advantage in an automatic machine; which is simple in construction and positive in action; and which will not stick in closed position. Certain embodiments of the invention are shown in the accompanying drawings, wherein:

Figure 1 is a side elevation of a machine emloying the chuck shown in said application. Fig. 2 is a partial end elevation of the machine showing one of the parts of the device. Fig. 3 is a partial section on an enlarged scale as compared with Fig. 1. Figs. 4, 5, 6, and 7 are detail views on an enlarged scale of certain of the parts of the construction. Fig. 8 is a section through a modification. And Figs. 9 and 10 are detail side elevations, somewhat diagrammatic in character showing the relation of the stop and cam devices of the Fig. 8 construction.

Referring to the drawings, 1 is the frame of the machine; 2 and 3 are carriages mounted for movement back and forth on suitable guideways on the frame upon which are mounted the turrets 4 and 5; and 6 is the casing for the chuck, which chuck includes a pair of jaws 7 and 8 for gripping the coupling 9. An electric motor (not shown) provides the motive power for driving the machine. Each turret has four arms provided with tools or other means adapted to act upon or cooperate with the couplings, as fully set forth in my application heretofore referred to. It is sufficient here to explain that the chuck is rotated at proper intervals so that the various tools carried by turrets are moved into engagement with the rotating coupling to perform the function of threading and otherwise machining it.

The chuck to which the present invention relates comprises the pair of jaws 7 and 8 mounted for sliding radial movement in the chuck frame which consists of the plates 10 and 11, bolted together and provided with the hubs 12, 12 journalled in the bearings 13, 13. The jaws have threaded therethrough the screw shafts 14, 14 with the bevel gears 15, 15 keyed to their outer ends, the rotation of the shafts serving to move the jaws in and out. Bolted to the plate 10 is the spur gear 16 which is driven from a pinion (not shown) which in turn is driven by the motor. The chuck frame is thus rotated from the motor and its direction of rotation is reversed when the motor is reversed, such reversal coming into play when the tap carried by the turret 4 is advanced to cut the threads in the left hand end of the coupling.

Mounted on the hub 12 of the plate 11 is the annular plate 17 having at one edge the bevel gear 18 meshing with the gears 15, 15. To the right of the plate 17 is mounted an annular plate 19. Lying in an annular recess formed between the shoulder 20 of the plate 19 and the flange 21a on the plate 17 are the series of friction rings 21, 21, etc., one-half of which are held against rotation with respect to the plate 19, and the other half being held against rotation with respect to the plate 17. Keys are employed to hold the rings against rotative movement, this form of friction clutch being well-known, and the desired amount of pressure between the rings is secured by the annular member 22 pressed yieldingly to the left against the outer ring by the springs 23 surrounding a series of adjustable stud bolts 24 screwed into the plate 17.

The plate 19 is provided with a series of four stop lugs 25, 25 (Fig. 5) adapted to be engaged by the plunger 26 moved down by the solenoid 27 (Fig. 2) when the coil thereof is energized, this being accomplished through the lever 28 pivoted to the plunger. A spring 29 serves to withdraw the plunger when the circuit through the solenoid winding is interrupted. When the rotation of the plate 19 is stopped by the plunger, the plate 17 is held frictionally against rotation, so that the rotation of the chuck frame carrying bevel gears 15 past the gear 18 causes such gears 15 to be rotated, thus opening or closing the chuck jaws, depending on the direction of rotation of the chuck frame. The withdrawal of the plunger 26 releases the plate 19, so that it turns with the chuck frame, at which time the rotation of the gears 15 stop, and the chuck jaws are maintained in either open or closed position until the plates 19 and 17 are again prevented from rotating.

In order to prevent the chuck jaws from being separated too far or from being moved inward too far, the yoke 30 (Figs. 3 and 4) is secured to the plate 11 with its fingers 31 straddling a lug 32 projecting from the periphery of the plate 17. The fingers 31 are spaced so that the movement of the chuck frame 10, 11 with respect to the plate is about 15 inches, after which one of the fingers 31 engages the lug 32, and the frame and plate no longer move relatively and the movement of the chuck jaws is stopped.

Chuck jaws have a tendency to stick in clamping, or closed position, and the friction clutch 21 will sometimes continue slipping, without starting the jaws to open. To insure the positive opening of the jaws at this time, the device shown in Figs. 6 and 7 is provided. This comprises the latch 33 pivoted to the periphery of the plate 17 at 34 and having a hook end 35 adapted to engage one of the recesses in the lugs 25. When this occurs, the plate 17 must rotate relative to the chuck frame 10, 11, so that the gears 15, 15 are rotated, thus releasing the jaws from the coupling. After a limited period of engagement, the latch is released by the cam member 36 on the plate 11 which engages the end 37 and cams it inward. A flat spring 38 normally presses the latch into the position shown, its movement being limited by the stop pin 39. The cam member 36 is similar in mounting to the member 30 and is similarly connected to the periphery of the plate 11, but is located at about 180 degrees from the member 30 and is arranged to unlock the latch 33 from the lug 25 before one of the fingers 31 (Fig. 15) engages the lug 25.

Fig. 8 illustrates a modification which in certain respects presents advantages over the structure heretofore described, one of such advantages residing in the construction whereby no reversal of the direction in which the chuck is driven is required in order to unscrew the chuck jaws and release the coupling. In certain other respects, the structure of this modification presents advantages in the matter of simplicity and positiveness of operation. Only one-half of the chuck is shown following the showing in Fig. 3, but it will be understood that the lower half of the chuck structure is similar to the upper half. The jaw $35^a$ is moved back and forth by the screw $36^a$ carrying at its outer end the bevel gear $37^a$, the shank of the jaw being guided in the plates $38^a$ and $39^a$ constituting the chuck frame. In this case the chuck frame is mounted for rotation in the roller bearings 40, 40 and is rotated by a spur gear 41 bolted to the plate 39 and driven from a pinion (not shown). A plate 42 (corresponding to the plate 17 of Fig. 3) is free to rotate on the hub of the plate $38^a$ and is provided with the bevel gear 43 meshing with the gear $37^a$. To the right of the plate 42 is an annular plate 44 (corresponding to the plate 19 of Fig. 3), a disc clutch 45 similar to the clutch of Fig. 3 serving to provide a friction connection between the plates 42 and 44. This clutch, as in the other construction, can be adjusted to give the right degree of gripping force with which the chuck jaws engage the coupling and give the necessary slip or give in the apparatus in order to permit it to function without injury to the parts.

The plate $38^a$ is provided with a pair of stops 46 at 180 degrees from each other corresponding to the stops 25 of the first construction and adapted to be engaged by the plunger 47 of a solenoid, such plunger being spring held in upper non-engaging position when the winding of the solenoid is not energized. A cam 48 carried by the plate $38^a$ engages a bevel surface $48^a$ of the plunger and forces it upward to release position after the jaws of the chuck have been screwed inward to a limited distance, as later explained.

On the left hand side of the pinion $37^a$ is a plate 49 loose of the hub of the plate $39^a$ and having a bevel gear 50 engaging the pinion $37^a$. The plate 49 is provided with a stop 51 similar to the stop 46 and adapted to be engaged by the plunger 52 of a solenoid corresponding in action and construction to the solenoid which operates the plunger 47. The plate $39^a$ is also provided with a cam 53 adapted to engage a cam surface 54 on the plunger 52 and force it outward to release position after the jaws of the chuck have been moved outward a limited distance. The side wall of the plate 49 is provided with a slot 55 about fifteen inches long in which is mounted the end of the stop member 56 carried by the spur gear 41.

It will be seen that when the plate 42 is held against rotation by the parts 44, 46, and 47 (as in the first construction) the rotation of the chuck frame will cause the gears $37^a$ to be rotated so as to move the chuck jaws inward to engage the coupling, and that when the plunger 47 is released and the plunger 52 moved down to engage the stop 51, the gear $37^a$ will be rotated in the reverse direction to move the chuck jaws outward since the bevel gear 50 on the plate 49 engages such gear $37^a$ on the side opposite to which the gear 43 (on the plate 42) engages it. With this construction, it is therefore, unnecessary to reverse the direction of rotation of the gear 41 and chuck frame.

The operation is as follows: A coupling having been placed between the jaws $35^a$, the plunger 47 is moved down to the position shown in Figs. 8 and 10, thus engaging one of the stops 46 on the plate 44 and stopping the rotation of such plate and the plate 42. The rotation of the chuck frame and the engagement of the gear 37ª with the gear 43 on the plate 42 causes the rotation of the gears 37ª when the gear 43 is held against rotation so that the jaws 35ª are screwed down until they engage the coupling with a force depending upon the adjustment of the clutch 45. When the jaws engage the coupling, the gears 37ª can no longer rotate so that the turning of the chuck frame causes the gear 43 and plate 42 to rotate until the cam 48 engages the cam surface 48a on the plunger 47 thus forcing it up and releasing the stop 46. The current through the solenoid winding is cut off before the camming up of the plunger, but the spring which tends to move the plunger upward is insufficient to lift the plunger due to the friction between the stop 46 and the plunger, so that some positive releasing means, such as the cam 48 is required.

After the coupling is machined and it is desired to release it, the plunger 52 is moved down to the engaging position shown in Figs. 8 and 9. The plate 49 is now held against rotation causing the gear 37ª to revolve so as to move the chuck jaws to the rear. At the time the plunger engages the stop 51, the stop pin 56 occupies the dotted line position A (Fig. 9) with respect to the groove 55. The movement of the chuck frame and the reverse movement of the gears 37ª continue until the cam 53 on the plate 39ª engages the cam surface 54 on the plunger 52 and moves it out to release position. Just following the release of the plunger 52, the slot 55 arrives at its position with the pin 56 in proximity to the end of the slot as indicated in Fig. 9. This completes the normal cycle of the chuck as it is now open and ready to receive a new coupling. When a new coupling is positioned and the screwing in of the jaws occurs as heretofore described, the plate 49 is rotated backward so that the pin 46 lies about midway of the length thereof as indicated at A (Fig. 9), at which time the jaws are tight on the coupling. In case no coupling is in place to stop the inward movement of the jaws 35ª, they might be screwed in too far and the slot and pin serve to guard against this contingency. The backward rotation of the plate is stopped when the pin engages the right hand end of the slot. This stops the rotation of the gear 37ª and also of the gear 43, so that the plate 42 turns with respect to the plate 44 (held by the plunger 47) until the cam 48 rides beneath the plunger and forces it upward releasing the stop 44 and stopping the inward movement of the jaws.

The invention is not limited to the use of two jaws 35ª as more may be used if desired. The invention is also not limited to screw means like the screws 36ª for moving the jaws in and out as any form of screw means known in the art may be substituted, the only requirement being that the screw means be operated by a rotary member mounted on the rotating chuck frame so as to move the jaws when such rotary member is held against movement and provided with friction stop means.

What I claim is:

1. In combination in a machine tool, a frame mounted for rotation, means for rotating the frame, a pair of jaws mounted for movement radially of the frame, rotatable means for moving the jaws in and out when held against movement, a clutch member concentric with said means and having continuous frictional engagement therewith, and movable stop means which in one position engages the clutch member and prevents its movement and in another position releases said member.

2. In combination in a machine tool, a chuck frame mounted for rotation, means for rotating the frame, jaws mounted for movement radially of the frame, rotatable means on the chuck frame cooperating with the jaws to move them radially when said means are held against movement, a clutch member having adjustable continuous frictional engagement with said means, and movable stop means which in one position engages the clutch member and prevents its movement and in another position releases said member.

3. In combination in a machine tool, a chuck frame mounted for rotation, means for rotating the frame, jaws mounted for movement radially of the frame, rotatable means concentric with the frame and arranged to cause the jaws to move radially when such means are held against movement, a clutch member concentric with said means and having continuous frictional engagement therewith, and movable stop means which in one position engages the clutch member and prevents its movement and in another position releases said member.

4. In combination in a machine tool, a chuck frame mounted for rotation, means for rotating the frame, jaws mounted for movement radially of the frame, a pair of rotatable means on the chuck frame cooperating with the jaws to move them radially when such means are held against movement, one of said pair of means causing the jaws to move in one direction when so held and the other of said pair of means causing the jaws to move in the reverse direction when so held, a clutch member having continuous frictional engagement with that one of the said pair of means which causes the inward movement of the jaws, movable stop means which in one position engages the clutch member and prevents its movement and in another position releases said member, and other movable stop means for engaging the other of said pair of means.

5. In combination in a machine tool, a chuck frame mounted for rotation, means for rotating the frame, jaws mounted for movement radially of the frame, a pair of rotatable means on the chuck frame concentric therewith cooperating with said jaws to move them radially when such means are held against movement, one of said pair of means causing the jaws to move in one direction when so held and the other of said pair of means causing the jaws to move in the reverse direction when so held, a clutch member also concentric with the frame having adjustable continuous frictional engagement with that one of the said pair of means which causes the inward movement of the jaws, movable stop means which in one position engages the clutch member and prevents its movement and in another position releases said member, and other movable stop means for engaging the other of said pair of means.

6. In combination in a machine tool, a chuck frame mounted for rotation, means for rotating the frame, jaws mounted for movement radially of the frame, rotatable means on the chuck frame cooperating with the jaws to move them radially when said means are held against movement, a clutch member having frictional engagement with said means, movable stop means for engaging the clutch member, and cam means operated by the movement of said rotatable means for releasing said stop means.

7. In combination in a machine tool, a chuck frame mounted for rotation, means for rotating the frame, jaws mounted for movement radially of the frame, a pair of rotatable means on the chuck frame concentric therewith cooperating with said jaws to move them radially when such means are held against movement, one of said pair of means causing the jaws to move in one direction when so held and the other of said pair of means causing the jaws to move in the reverse direction when so held, a clutch member also concentric with the frame having frictional engagement with that one of said pair of means which causes the inward movement of the jaws, movable stop means for engaging said clutch member, other stop means for engaging the other of said pair of means, cam means operated by the movement of one of said pair of rotatable means for releasing the first of said stop means, and cam means operated by the movement of the frame for releasing the other of said stop means.

8. In combination in a machine tool, a chuck frame mounted for rotation, means for rotating the frame, jaws mounted for movement radially of the frame, a pair of rotatable means on the chuck frame concentric therewith cooperating with said jaws to move them radially when such means are held against movement, one of said pair of means causing the jaws to move in one direction when so held and the other of said pair of means causing the jaws to move in the reverse direction when so held, a clutch member also concentric with the frame having frictional engagement with that one of said pair of means which causes the inward movement of the jaws, movable stop means for engaging said clutch member, other stop means for engaging the other of said pair of means, cam means operated by the movement of one of said pair of rotatable means for releasing the first of said stop means, cam means operated by the movement of the frame for releasing the other of said stop means, and a lost motion connection between the frame and said other of said pair of means.

9. In combination in a machine tool, a frame mounted for rotation, means for rotating the frame, a pair of jaws mounted for movement radially of the frame, a screw for each jaw arranged so as to move the jaw in and out by its rotation, a pinion carried by each screw, a gear concentric with the axis of rotation of the frame engaging said pinions and free to rotate with the frame or relative thereto, a clutch member concentric with said gear and having frictional clutch engagement with the gear, and movable stop means for engaging the clutch member.

10. In combination in a machine tool, a frame mounted for rotation, means for rotating the frame, a pair of jaws mounted for movement radially of the frame, a screw for each jaw arranged so as to move the jaw in and out by its rotation, a pinion carried by each screw, a gear concentric with the axis of rotation of the frame engaging said pinions and free to rotate with the frame or relative thereto, a clutch member concentric with said gear and having frictional clutch engagement with the gear, movable stop means for engaging the clutch member, and stop means for limiting the movement of rotation of said gear with respect to said frame.

11. In combination in a machine tool, a frame mounted for rotation, means for rotating the frame first in one direction and then in the reverse direction, a pair of jaws mounted for movement radially of the frame, a screw for each jaw arranged so as to move the jaw in and out by its rotation, a pinion carried by each screw, a gear concentric with the axis of rotation of the frame engaging said pinions and free to rotate with the frame or relative thereto, a clutch member concentric with said gear and having frictional clutch engagement with the gear, and movable stop means for engaging the clutch member.

12. In combination in a machine tool, a frame mounted for rotation, means for rotating the frame, a pair of jaws mounted for movement radially of the frame, a screw for each jaw arranged so as to move the jaw in and out by its rotation, a pinion carried by each screw, a gear concentric with the axis of rotation of the frame engaging said pinions and free to rotate with the frame or relative thereto, a clutch member concentric with said gear and having frictional clutch engagement with the gear, movable stop means for engaging the clutch member, a latch for securing the gear and clutch member positively together, and means movable with the rotating frame for releasing the latch.

13. In combination in a machine tool, a frame mounted for rotation, means for rotating the frame, a pair of jaws mounted for movement radially of the frame, a screw for each jaw arranged so as to move the jaw in and out by its rotation, a pinion carried by each screw, a gear concentric with the axis of rotation of the frame engaging said pinions and free to rotate with the frame or relative thereto, a clutch member concentric with said gear and having frictional clutch engagement with the gear, movable stop means for engaging the clutch member, a latch for securing the gear and clutch member positively together, and means carried by the rotating frame and adapted to engage the latch and release it.

In testimony whereof, I have hereunto subscribed my name this 3rd day of December, 1930.

ROBERT L. HIBBARD.